US006706369B1

(12) United States Patent
Thomsen

(10) Patent No.: US 6,706,369 B1
(45) Date of Patent: Mar. 16, 2004

(54) METHOD FOR THE MANUFACTURE OF A PANEL AND A PANEL OBTAINED BY SUCH A METHOD

(75) Inventor: Jørgen Thomsen, Rønde (DK)

(73) Assignee: Hornslet Møbelfabrik A/S, Hornslet (DK)

( * ) Notice: Subject to any disclaimer, the term of this patent is extended or adjusted under 35 U.S.C. 154(b) by 0 days.

(21) Appl. No.: 10/069,922

(22) PCT Filed: Sep. 2, 1999

(86) PCT No.: PCT/DK99/00461

§ 371 (c)(1),
(2), (4) Date: Mar. 5, 2002

(87) PCT Pub. No.: WO01/17737

PCT Pub. Date: Mar. 15, 2001

(51) Int. Cl.$^7$ .............................. B32B 3/00; B31F 1/00

(52) U.S. Cl. ....................... 428/172; 428/109; 428/167; 428/168; 428/188; 428/541; 156/196; 156/211; 156/257

(58) Field of Search ................................ 428/167, 172, 428/541, 120, 188, 106, 109, 168, 169; 156/196, 211, 257, 250, 268

(56) References Cited

U.S. PATENT DOCUMENTS

| | | | | |
|---|---|---|---|---|
| 2,181,164 A | * 11/1939 | Alexander | .................. | 428/167 |
| 2,253,219 A | * 8/1941 | Alexander | .................. | 428/167 |

FOREIGN PATENT DOCUMENTS

| | | |
|---|---|---|
| DE | 2815714 | 10/1979 |
| DE | 4340049 | 6/1995 |
| DK | 172290 | 3/1998 |
| EP | 0553420 | 8/1993 |
| WO | 8806855 | 9/1988 |
| WO | 9823422 | 6/1998 |

* cited by examiner

*Primary Examiner*—Donald J. Loney
(74) *Attorney, Agent, or Firm*—Dykema Gossett PLLC

(57) ABSTRACT

The present invention relates to a method of manufacturing a panel (1, 1', 1"), wherein a hoard (6) is coated with a flexible layer (2) on a first side (7), said board (6) having a plurality of grooves (8) for facilitating the bending of the panel (1) to a curved shape. The invention also relates to a panel (1, 1', 1") manufactured by such a method.

15 Claims, 5 Drawing Sheets

METHOD FOR THE MANUFACTURE OF A PANEL AND A PANEL OBTAINED BY SUCH A METHOD

Figure 1:
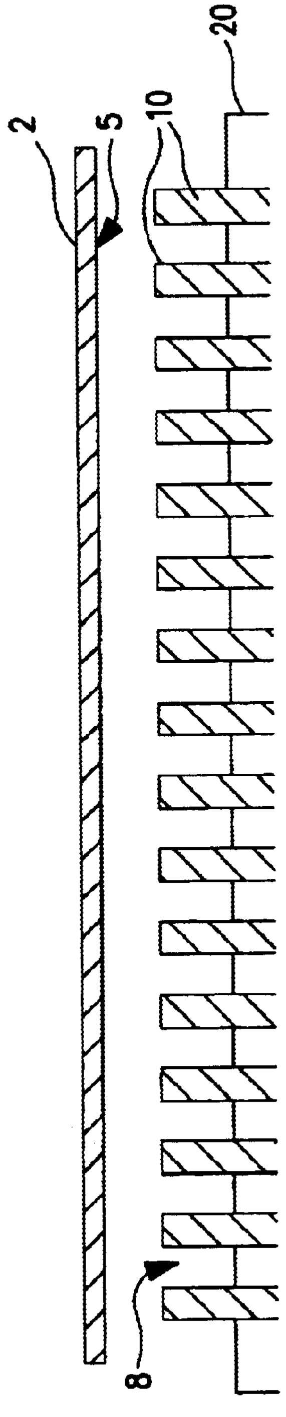

The present invention relates to a panel and a method of manufacturing a panel , wherein aboard is coated with a flexible layer on a first side, said board having a plurality of grooves for facilitating the bending of the panel to a curved shape.

It is known from DE-A-28 15 714 to manufacture convex bending in a coated panel consisting of a wooden fibre board by providing the front side with one or more layers of veneer and cutting specially shaped grooves in the rear side of the panel. The grooves are cut in parallel and with a depth leaving a thin unbroken fibre layer carrying the veneer coating. The panel is then bent to a convex shape, following which the veneered convex top side is given a finishing smoothening and polish in order to smoothen the stepwise bending form of the veneer top layer. In production it is critical if the cutting of grooves only leaves a thin unbroken fibre layer. The depth of cutting is difficult to control, and the remaining fibre layer might become very thin. The bending of a panel is only limited by the veneer layer, and bending over the limitation of the veneer can damage the board.

Techniques of bending panel material by cutting grooves in the rear side of the panel are also known from EP-A-0 553 420 and DE-A-43 40 049. However, since the panels are uncoated, these patent literature documents do not deal with the specific problems of avoiding steps in the curved section of a veneer coated panel.

The importance of the shape of the grooves is realised from the known methods of the manufacture of curved panels. The costs of manufacturing such a panel are somewhat high due to the accuracy with which such grooves must be made. Like in the case of the method according to DE-A-28 15 714 (see above), the manufacturer regards it as most beneficial to provide the panel with final finish after the bending, it being realised that it is otherwise unlikely that a smooth and continuous curvature of the bend will be obtained. Such a final finish has to be carried out manually due to the curvature of the surface.

Recently, it has been realised that by cutting the grooves with a rectangular shape and with a perfect precision a smooth and continuously curved veneer top layer can be obtained without having to make any expensive final finish on the curved surface. By this development it has been realised that a uniform thickness of the veneer carrying top fibre layer is of vital importance. Such a method is known from DK 172 290 B1. Such grooves can be produced with the necessary precision a computer controlled machine centre, whereby the manufacturing costs are somewhat reduced.

The object of the invention is to provide a panel and a method for producing such panel, which is more cost efficient in terms of production, and which ensures a satisfying accuracy of the grooves, such that a curved panel is provided in an inexpensive and reliable manner.

This can be obtained by a board or a method of manufacturing the board as described in the opening paragraph, said method where the flexible layer is a laminated fibre board, said fibre board being adhesively joined with the first side of a board which is provided with grooves.

In this way the flexibility of the board is high and only limited by the dimension of the grooves and the flexibility of the flexible layer This manufacturing process can be carried out with a high degree of automation, which results in a cost efficient method of producing curved panels.

The grooves can be open to the first side before joining with the flexible layer. In this way the grooves can be made in the board before the joining process.

Instead the flexible layer can be adhesively joined with the first side of the board, which is provided with grooves open to the second side, where the flexible layer is coated with a veneer layer. The surface treatment of the board can be finished before cutting the grooves. This is a cost effective way of producing boards with only few bending zones.

The board may consist of a number of strips, with the formed between the strips. In this way a number of strips can be produced with a uniform shape from many different materials. The strips can be placed on a board, with a flexible layer bonded to the surface of the strips.

The board may also comprise of a remaining layer on the second side of the board which remaining layer is at least partly removed, whereby the grooves are reopened. By reopening the grooves from the opposite side a number of strips are produced, with a flexible layer bonded to the surface of the strips.

The panel may be bent to a curved shape and be fixed in this shape by fixation means. Panels of different shapes can be produced in an inexpensive manner.

The fixation means may be applied as a sheet which is vapour impermeable. Humidity from the air cannot enter into the panel.

The panel may be fixed in the curved shape by adhesively joining the groove carrying second side of the panel with a second side of a further board, which is provided with grooves. A double sided panel can be produced in a cost efficient manner.

The grooves may be filled with a resilient or solid material said, material fixes the panel in a given position, and if the panel is used for loudspeaker cabinets the filling material can improve the acoustic data of the loudspeaker.

The board may be provided with one or more groups of grooves. Hereby a panel can be produced which is designed for sectional curvature bending as well as corner bending, since it is possible to cut an almost penetrating V-groove in the rear side of the panel.

The flexible layer may be given a finishing treatment prior to any possible subsequent bending of the panel. This means that no additional labour intensive surface treatment will be required after the bending process.

The grooves can run in different directions in the panel, where the grooves are crossing. In this way the panel becomes flexible in more than one direction. Panel can be formed in different curved shapes.

The grooves can also run in curved directions in the panel, where the grooves are crossing.

The flexible layer may consist of a veneered fibre board which is placed on the first side of the board. In this way curved furniture can be produced in a cost efficient manner.

The flexible layer might instead consist of a single flexible layer which is made of a metal. A curved metal surface can be achieved in a very inexpensive manner.

The flexible layer may also consist of a single flexible layer which is made of a fibre material.

Figure 2:
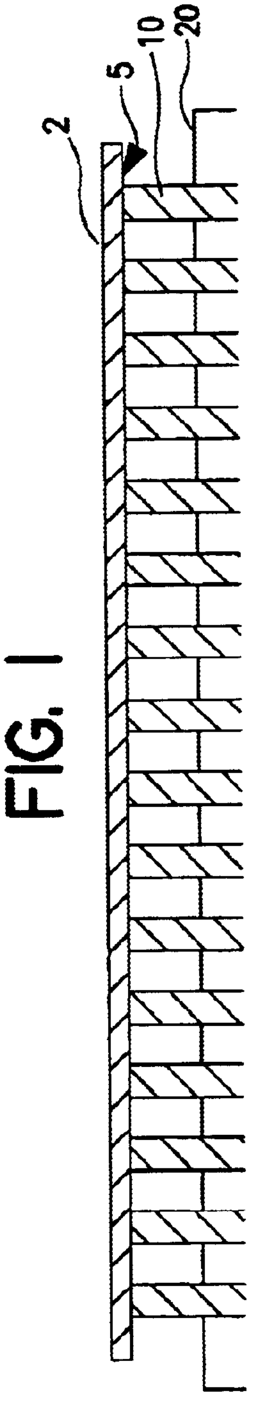
Figure 3:
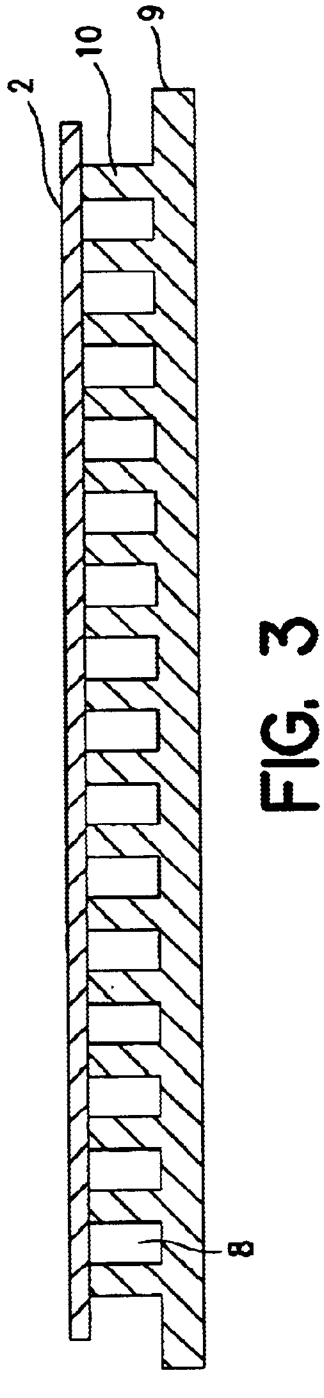
Figure 4:
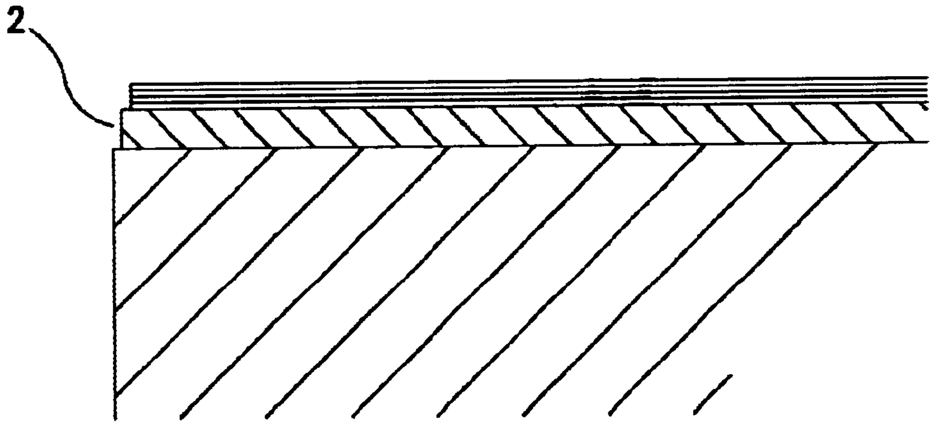
Figure 5:
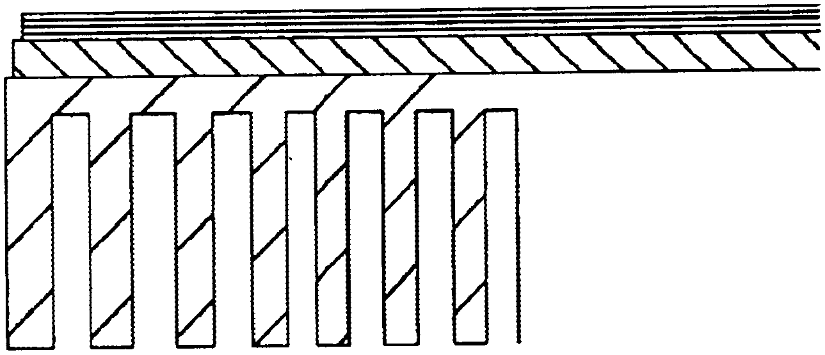
Figure 6:
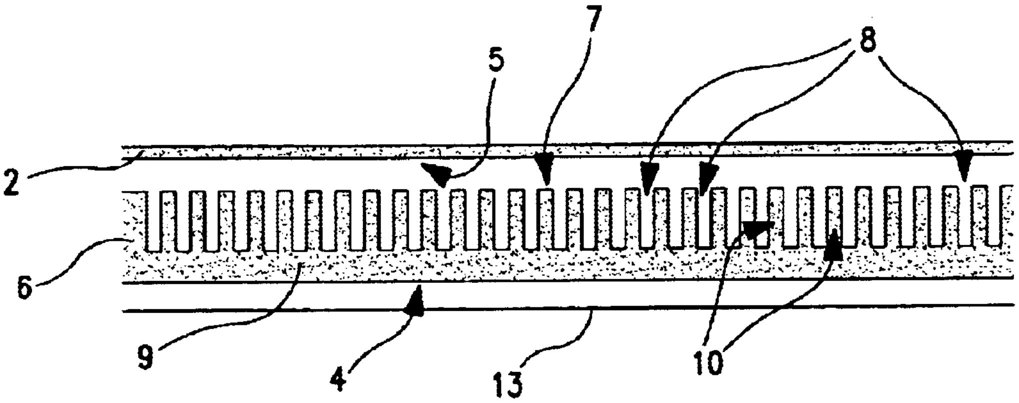
Figure 7:
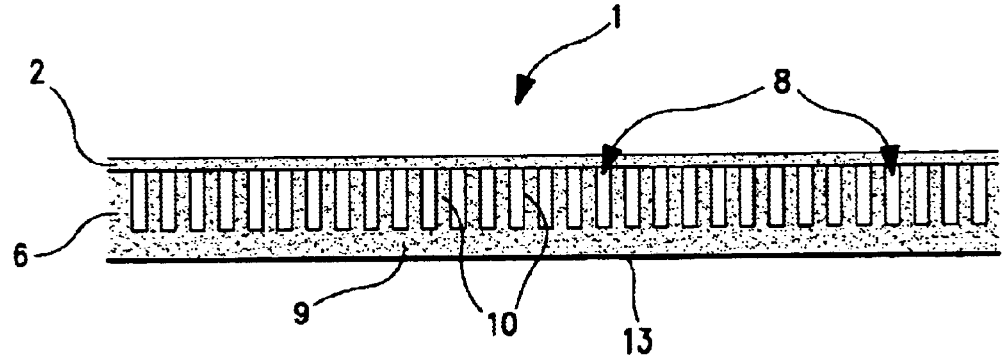
Figure 8:
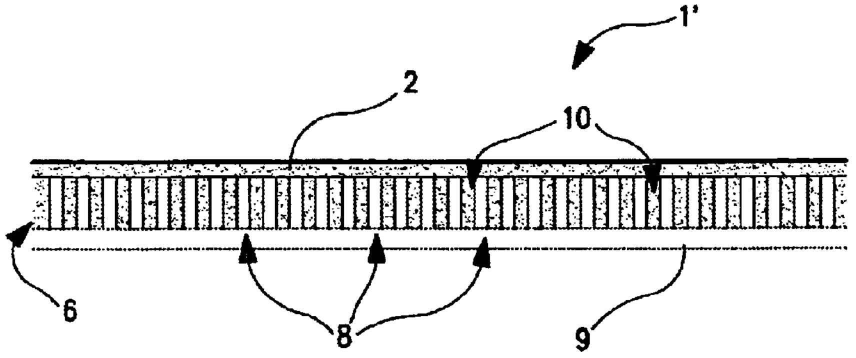
Figure 9:
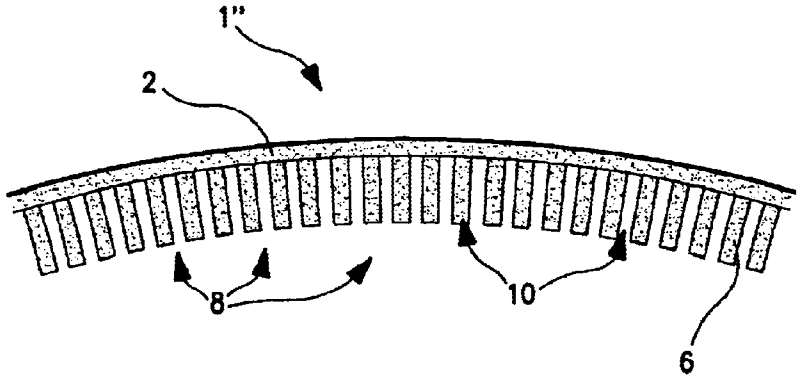
Figure 10:
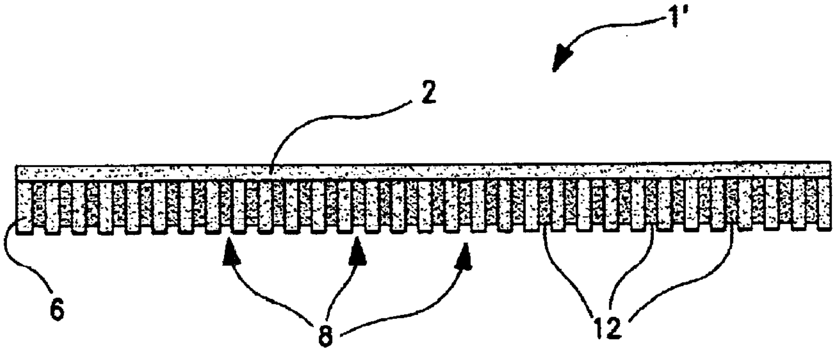
Figure 11:
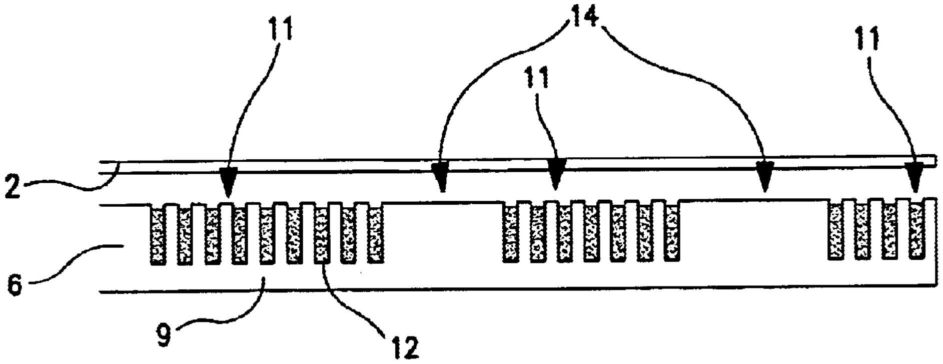
Figure 12:
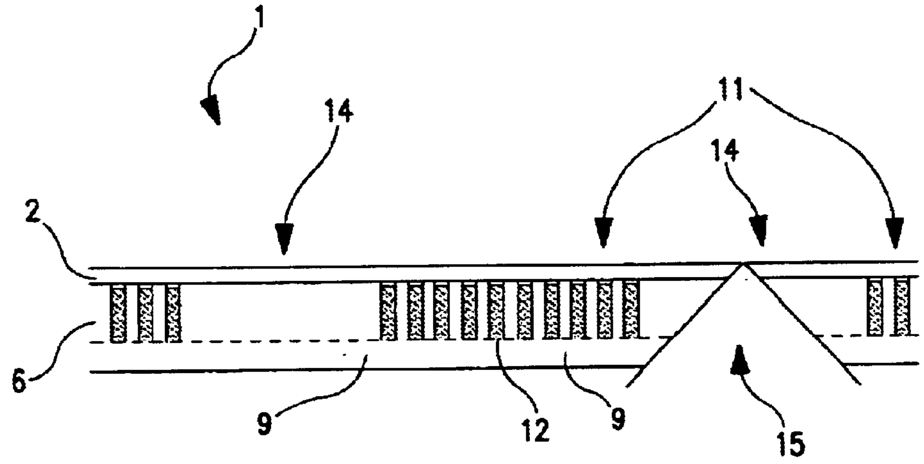
Figure 13:
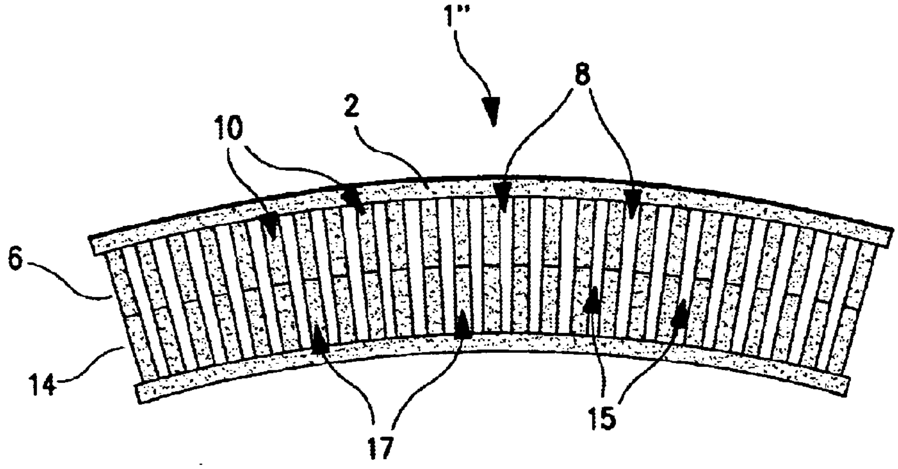

The invention will be explained in more detail in the following with reference to the accompanying drawings, in which:

FIG. 1 is a cross-sectional view of the elements of a panel with strips according to the invention prior to their assembly, FIG. 2 is a cross-sectional view of the assembled panel in FIG. 1, FIG. 3 is a cross-sectional view of a particular embodiment of the assembled panel, FIG. 4 is a cross-sectional view of the assembled panel without grooves, FIG. 5 is a cross-sectional view of another particular embodiment of the assembled panel, FIG. 6 is a cross-sectional view of the elements of a panel according to the invention prior to their assembly, FIG. 7 is a cross-sectional view of the assembled FIG. 8 is a cross-sectional view of a panel according to the invention prior to the bending thereof, FIG. 9 is a cross-sectional view of a curved section of a panel according to the invention, FIG. 10 shows a particular embodiment of the panel according to the invention, FIG. 11. shows the elements of another embodiment of a panel according to the invention, FIG. 12 shows the assembled panel, shown in FIG. 11, and FIG. 13 is a cross-sectional view of a panel fixed in a curved shape.

FIG. 1 shows a method of manufacturing a panel where a number of strips 10 are arranged in a fixture 20 before an overlying flexible board 2 is connected by its face 5 with the uppermost face of the strip 10 by means of an adhesive, as shown in FIG. 2. As long as the strips 10 are arranged in the fixture 20, the panel will be rigid, and the flexible board 2 may be finished and optionally polished before the strips 10 are released from the fixture 20. After release, the board will be a very flexible board, exactly with the surface finish which has previously been performed on the plane surface. FIG. 3 differs in that the strips 10 are kept together by an underlying solid board 9, where the strips 10 may have been produced by prior cutting of the grooves 8, which may have been done either by milling or sawing. After the flexible board 2 has been secured to the strips 10 e.g. by gluing, the lowermost part of the board 9 may be removed by a cutter, so that the final result will be open strips, as shown in FIG. 2.

FIG. 4 shows a panel 1 consisting of a flexible layer 2 coated with veneer where the rear side 5 of the flexible layer 2 is joined to a first side 7 of a board 6. In FIG. 5 the panel 1 has been provided with grooves 8 on the second side 4 of the board 6 leaving only a thin layer of the board 6 at the bottom of the grooves 8. FIG. 6 shows a flexible layer 2 having a rear side 5. The rear side 5 is joined with a first side 7 of a board 6 which is provided with grooves 8 that are cut out in the board 6. By the cutting of the grooves 8 a number of strips 10 are formed in the board 6, while leaving a through-going remaining layer 9 of the board 6. A thin sheet 13 is provided on the second side 4 of the board 6. This sheet is preferably of a vapour impermeable material so as to maintain a stable moisture content in the board 6 of the panel 1 during storage and transportation.

The flexible layer 2, the grooved board 6 and the protecting sheet 13 are adhesively joined together as shown in FIG. 7. The panel 1 as shown in FIG. 7 is well suited for storage under normal storage conditions, whilst awaiting the bending operation.

In order to prepare the panel 1' for bending, the remaining layer 9 is removed, as shown in FIG. 8, thereby reopening the grooves 8 at the other end as they previously were. What remains of the board 6 is hereby only the strips 10—at least in the sections that are being prepared for curvature bending.

FIG. 9 shows the panel 1" which is bent in a curved shape.

FIG. 10 shows a panel 1' ready for curvature bending, where the grooves 8 are filled with a resilient or solid material 12, such as a damping material. This material can be applied either after the rear layer 9 of the board 6 is removed or prior to the assembly of the panel 1, i.e. during the preparation of the board 6. FIGS. 11 and 12 show another embodiment of the invention. In this embodiment the board 6 is provided with groups 11 of grooves 8, and between the said groups 11 there are sections 14 of regular board which are uncut. If necessary, a V-groove 15 can be cut in such a section 14, as shown in FIG. 12, so that corner folding and also panel curving can be carried out with a panel according to the invention.

FIG. 13 shows a curved panel 1" which is fixed in its curved shape by means of a further board 14 which, similar to the board 6 with grooves 8 and strips 10, is provided with grooves 15 and strips 17.

What is claimed is:

1. A method of manufacturing a panel (1), wherein a board (6) is coated with a flexible layer (2) on a first side (7), said board (6) having a plurality of grooves (8) for facilitating the bending of the panel (1) to a curved shape, wherein the flexible layer (2) is a laminated fibre board, said method comprising the steps of:

adhesively joining the fibre board with the first side (7) of the board (6) which is provided with grooves (8), said board (6) comprising a number of strips (10) fixated by a fixture (20) or being kept together by a further board (9), performing a finishing treatment on the flexible layer (2) while said layer has a plane surface, releasing said panel by releasing the fixture or by removing the further board (9) by cutting, bending the panel to a convex and/or concave shape, fixing the panel in the bent shape by fixation means (12, 13).

2. A method according to claim 1, wherein the grooves are formed in the board (6) from the first side (7) before adhesively joining the laminated fibre board (2) with the first side (7) of the board (6).

3. A method according to claim 1, wherein the grooves (8) are formed in the board (6) from a second side (4) after adhesively joining the laminated fibre board (2) with the first side (7) of the board (6).

4. A panel manufactured by a method according to claim 1, said panel consisting of a board which is coated with a flexible layer (2) on a first side, said board (6) having a plurality of grooves (8) for facilitating the bending to the panel (1) to a curved shape, wherein the flexible layer (2) is a laminated fibre board, said fibre board being adhesively joined with the first side (7) of the board (6) which is provided with grooves (8), said panel (1) being fixed in a convex and/or concave shape by fixation means (12, 13), said flexible layer (2) being provided with a surface finish, said finish having been performed prior to fixation.

5. A panel according to claim 4, wherein the grooves (8) are open to the first side (7).

6. A panel according to claim 4, wherein the flexible layer (2) is adhesively joined with the first side (7) of the board (6) which is provided with grooves (8) on a second side (4).

7. A panel according to claim 4, wherein the board (6) consists of a number of strips (10) on the rear side (5) of the flexible layer (2), with the grooves (8) formed between these strips (10).

8. A panel according to claim 4, wherein the fixation means (12, 13) is a further board (14) provided with grooves (15), equivalently shaped in the convex and/or concave configuration and fixed to the second side (4) of the board (6), whereby the grooves (8, 15) of both boards (6, 14) are closed.

9. A panel according to claim 4, wherein the grooves (8, 15) are at least partly filled with a resilient material.

10. A panel according to claim 4, wherein the grooves (8, 15) are at least partly filled with a solid material.

11. A panel according to claim 8, wherein the grooves (8) are at least partly filled with strips (17) from the further board (14), and the grooves (15) are at least partly filled with the strips (10) from the board (6).

12. A panel according to claim 4, wherein the flexible layer (2) is coated with a veneer layer.

13. A panel according to claim 4, wherein the flexible layer (21 is coated with a metal sheet.

14. A panel according to claim 4, wherein the grooves (8) run in different directions in the panel (1), where the grooves (8) are crossing.

15. A panel according to claim 4, wherein the grooves (8) run in a curved direction in the panel (1), where the grooves (8) are crossing.

* * * * *